United States Patent [19]
Lee

[11] Patent Number: 5,898,247
[45] Date of Patent: Apr. 27, 1999

[54] ELECTRIC MOTOR HAVING A SPHERICAL BEARING

[75] Inventor: Chang-Woo Lee, Suwon, Rep. of Korea

[73] Assignee: Samsung Electronics Co., Ltd., Suwon, Rep. of Korea

[21] Appl. No.: 08/961,425

[22] Filed: Oct. 30, 1997

[30] Foreign Application Priority Data

Nov. 9, 1996 [KR] Rep. of Korea ...................... 96-53177

[51] Int. Cl.$^6$ .............................. H02K 5/16; F16C 33/02
[52] U.S. Cl. .............................................. 310/90; 384/108
[58] Field of Search .......................... 310/90, 90.5, 67 R; 384/108

[56] References Cited

U.S. PATENT DOCUMENTS

| | | | |
|---|---|---|---|
| 3,856,367 | 12/1974 | Wohnhaas et al. | 384/108 |
| 4,798,476 | 1/1989 | Sakatani et al. | 384/108 |
| 5,488,523 | 1/1996 | Seaver et al. | 384/108 |
| 5,541,460 | 7/1996 | Dunfield et al. | 310/90 |
| 5,598,048 | 1/1997 | Dunfield et al. | 310/90.5 |

*Primary Examiner*—Clayton LaBalle
*Attorney, Agent, or Firm*—Burns, Doane, Swecker & Mathis, L.L.P.

[57] ABSTRACT

An electric motor includes a stator frame carrying a coil, and a rotor bushing carrying a magnet. The coil rotates the rotor bushing relative to the stator housing about a vertical axis. The stator frame and rotor bushing together form a cavity in which a spherical bearing is disposed. The rotor bushing includes a contact member engaging an upper portio of the spherical bearing with a point contact, to transfer the weight of the rotor bushing to the spherical bearing. The axis passes through the cavity and the spherical bearing. An outer cylindrical surface of the rotor bushing faces a cylindrical inner surface of the cavity and has grooves formed therein for drawing-in air.

8 Claims, 3 Drawing Sheets

ELECTRIC MOTOR HAVING A SPHERICAL BEARING

FIELD OF THE INVENTION

The present invention relates to an electrical motor having a bearing, and more particularly, to an electrical motor having a bearing with an improved shape.

BACKGROUND OF THE INVENTION

Among the different bearings that support shafts undergoing rotative or rectilinear movement and make such movement smooth, the semi-spherical bearing is advantageous in that it is able to simultaneously support load in both the radial and axial directions. Accordingly, it is unnecessary to use separate bearings for each of the directions such that weight can be reduced, allowing application to internal motors in electronic goods such as computer hard drives, laser beam scanners, laser beam printers, etc.

With regard to the laser beam printer, laser beams are used to perform the printing operation. That is, a scanned image is formed on a photosensitive drum, which is responsive to light, by radiating the laser beams thereon. A rotating multi-faceted mirror system is provided to move the beams at a uniform velocity such that the beams are aligned on the photosensitive drum in an axial direction thereon.

Referring to FIG. 1, there is shown a sectional view illustrating a rotating multi-faceted mirror system in which a conventional semi-spherical bearing is mounted. As shown in the drawing, the rotating multi-faceted mirror system 10 comprises a multi-faceted mirror 11 which reflects beams onto a photosensitive drum (not shown), and a motor 20 for rotating and supporting the multi-faceted mirror 11. A housing 12 is provided encasing the multi-faceted mirror 11. The housing 12 includes a hole 12a through which the multi-faceted mirror 11 is exposed.

The motor 20 comprises a stator 21 and a rotor 22, electromagnetically cooperating with the stator 21. The stator 21 includes a stator frame 21a and a stator coil 21b wrapped around the stator frame 21a, while the rotor 22 includes a rotor bushing 22a and a rotor magnet 22b provided around a circumference of the rotor bushing 22a. A lens bracket 13, which fixedly supports the multi-faceted mirror 11, is mounted on an upper portion of the rotor bushing 22a such that the multi-faceted mirror 11 rotates together with the rotor bushing 22a.

A semi-spherical bearing 24 is inserted in upper and lower parts of the rotor bushing 22a such that the bushing is supported and able to rotate. The semi-spherical bearings 24 are fixed by a support shaft 23 provided through a center of the rotor frame 21a, the semi-spherical bearings 24 being disposed such that their spherical portions face one another.

A plurality of grooves 24a are formed on an outer circumference of the semi-spherical bearings 24 to allow for smooth rotation with the rotor bushing 22a. The grooves 24a, as shown in FIGS. 2 and 3, are spiral-shaped to allow for suction of air for smooth rotation.

However, in the above-described prior art multi-faceted mirror system, the manufacturing process of the bearings is complicated. Namely, a lathe is first used to form the semi-spherical shape, and then the grooves are formed at a predetermined depth using an etching process. Because many steps are needed in the process to manufacture the semi-spherical bearing, overall manufacturing costs are increased.

Further, wear occurs between the bearings and rotor bushing, especially when the rotor bushing starts and stops its rotation. This results in a reduction in the life span of both the bearings and rotor bushing. Also, the wearing of these two elements makes it necessary to use increasingly larger amounts of electricity to maintain the same level of rotational speed.

SUMMARY OF THE INVENTION

The present invention has been made in an effort to solve the above problems. It is an object of the present invention to provide an electrical motor in which a bearing is formed in a spherical shape, making manufacturing of the bearing easy, and which reduces the number of steps in the bearing manufacturing process.

To achieve the above object, the present invention provides an electrical motor including a stator frame provided with a mounting space formed therein, the stator frame carrying a stator coil and a rotor bushing having a rotor magnet to be driven by the coil. The rotor bushing is provided with an insertion space. A spherical bearing is mounted in a cavity defined by the mounting space and the insertion space and supports the rotor bushing.

A contact member is provided on an upper side of the rotor bushing, the contact member protruding a predetermined distance toward the bearing and which is rounded on a side making contact with the bearing. The contact member is made of ceramic material.

A guide portion is formed in the insertion space, the guide portion being formed larger than, but following the curvature of, the bearing.

Grooves are formed on an outer circumference of the rotor bushing.

BRIEF DESCRIPTION OF THE DRAWINGS

The objects and advantages of the invention will become apparent from the following detailed description of preferred embodiments thereof in connection with the accompanying drawings, in which like numerals designate like elements, and in which.

DETAILED DESCRIPTION OF THE PREFERRED EMBODIMENT

A preferred embodiment of the present invention will now be described in detail with reference to the accompanying drawings.

Figure 1:
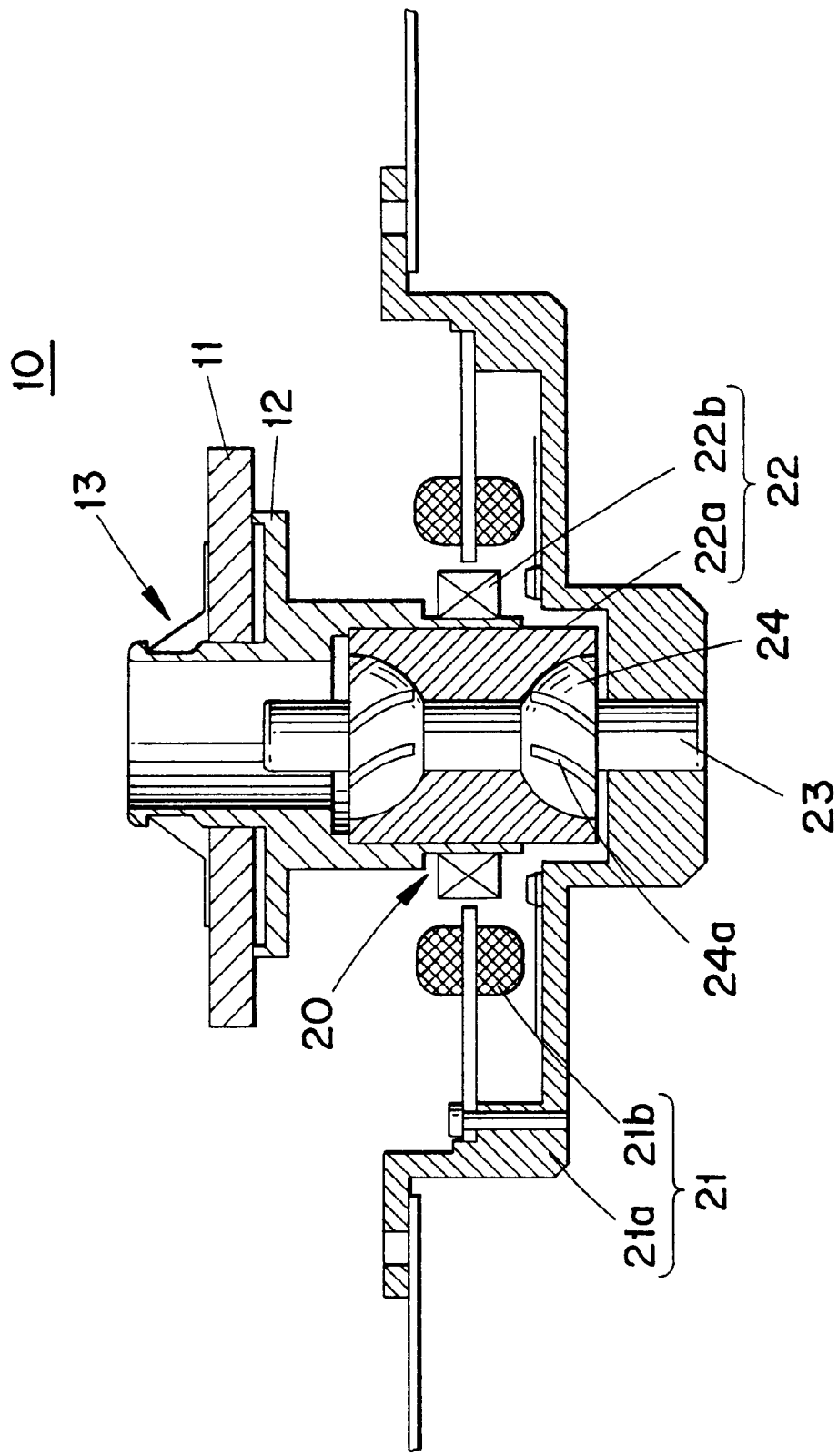
FIG. 1 is a vertical sectional view of the prior art rotating multi-faceted mirror system.
Figure 2:
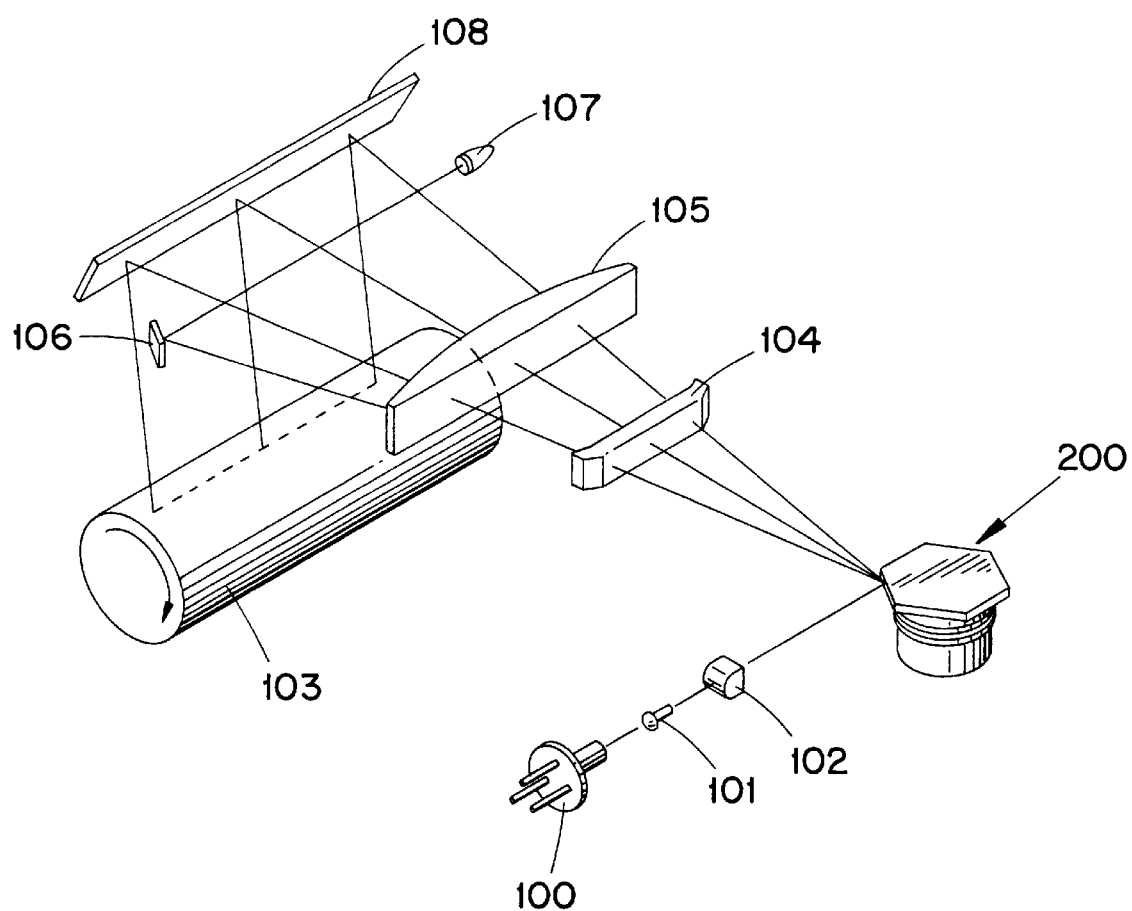
FIG. 2 is a schematic view of an internal structure of a laser beam printer using a rotating multi-faceted mirror system in which a motor according to a preferred embodiment of the present invention is applied.

Referring to FIG. 2, there is shown a schematic view of an internal structure of a laser beam printer using a rotating multi-faceted mirror system in which a motor according to a preferred embodiment of the present invention is applied.

As shown in the drawing, the laser beam printer comprises a semiconductor laser 100 and a collimate lens 101 for converting light from the semiconductor laser 100 into laser beams. The laser beam printer further comprises a rotating multi-faceted mirror system 200 for converting the laser beams into a fan beam, and a cylindrical lens 102 disposed between the multi-faceted mirror system 200 and the collimate lens 101.

There is provided a photosensitive drum 103 for recording a print information pattern using beams radiated from the cylindrical lens 102 via the multi-faceted mirror system 200. Disposed between the multi-faceted mirror system 200 and the photosensitive drum 103, in order, are a spherical lens 104, a toric lens 105, a horizontal synchronizing lens 106, a detecting sensor 107, and a reflector 108.

Beams are radiated toward the photosensitive drum 103 at a uniform velocity by the multi-faceted mirror system 200. The beams pass through the spherical lens 104 to be focused on the photosensitive drum 103, and are reflected onto desired positions on the photosensitive drum 103 by the reflector 108. Further, the horizontal synchronizing lens 106 and the detecting sensor 107 are used to ensure that the beams are radiated at equal horizontal positions on the photosensitive drum 103.

As stated above, light radiated from the semiconductor laser 100 passes through the collimate lens 101 to be converted into laser beams. These laser beams pass through the cylindrical lens 102 to be positioned parallel to one another. Perpendicular laser beams are condensed in the multi-faceted mirror system 200, while the horizontal laser beams are converted into a fan beam.

The laser beams are radiated from the multi-faceted mirror system 200 at a uniform velocity, such that they are at equal positions relative to an axial direction of the photosensitive drum 103, then pass through the toric lens 105 to be focused thereby. The laser beams are then reflected to a desired position on the photosensitive drum 103 by the reflector 108. Here, beams that are off course are reflected by the horizontal synchronizing lens 106 to be input into the detecting sensor 107 such that the laser beams are positioned correctly on the photosensitive drum 103.

Figure 3:
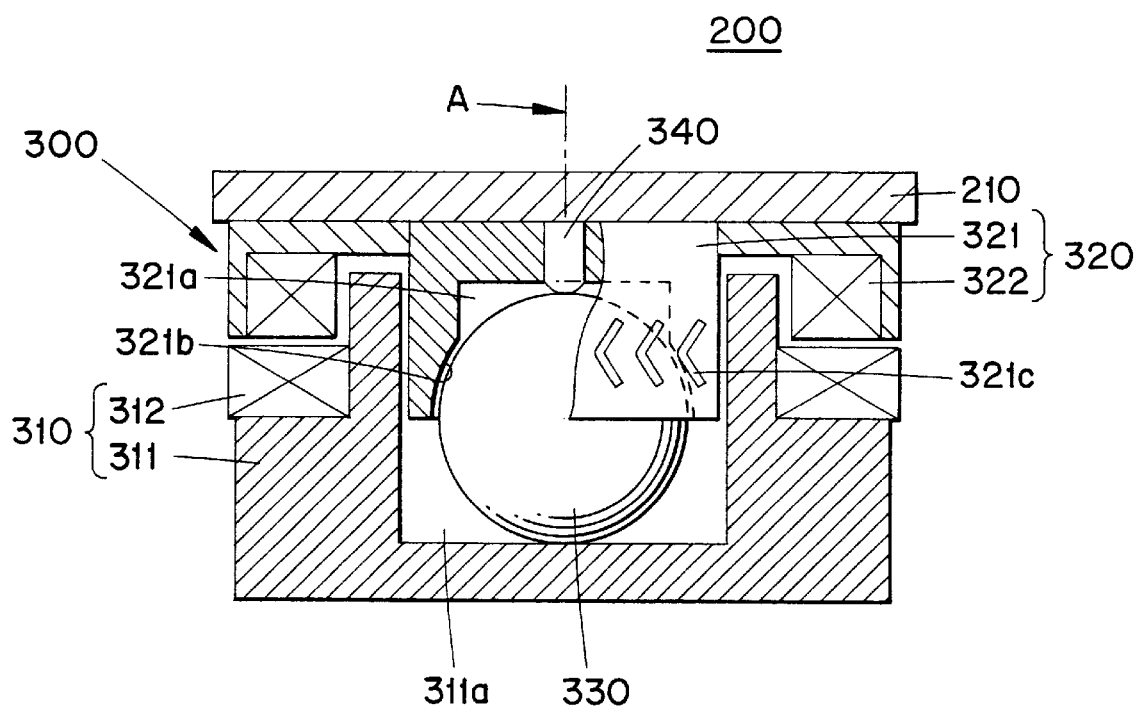
FIG. 3 is a vertical sectional view of the rotating multi-faceted mirror system and motor shown in FIG. 2.

Shown in FIG. 3 is a vertical sectional view of the rotating multi-faceted mirror system 200 shown in FIG. 2. As shown in the drawing, the rotating multi-faceted mirror system 200 includes a multi-faceted mirror 210 which reflects beams onto the photosensitive drum 103 (see FIG. 2), and a motor 300 for rotating and supporting the multi-faceted mirror 210.

The motor 300 comprises a stator 310 and a rotor 320. The stator 310 includes a stator frame 311 and a stator coil 312 wrapped around an upper portion of the stator frame 311. Formed inside the stator frame 311 is an upwardly open mounting space 311a. The rotor 320 of the motor 300 includes a rotor bushing 321 and a rotor magnet 322 provided around a circumference of the rotor bushing 321. The coil 312 drives the magnet 322 and the rotor bushing about a vertical axis of rotation A.

A downwardly open insertion space 321a is provided in a cylindrical skirt portion of the rotor bushing 321 for mounting the multi-faceted mirror 210. A lower part of the rotor bushing 321 is inserted in the mounting space 311a. A bearing 330 is mounted in a cavity provided by the mounting space 311a and the insertion space 321a. The axis of rotation A of the rotor bushing passes through the cavity and the spherical bearing. The bearing 330 enables the rotor bushing 321 to rotate smoothly.

The bearing 330 is spherical and an upper portion thereof is inserted in the insertion space 321a, while a lower portion makes contact with a floor of the mounting space 311a. The bearing 330 is free to rotate relative to that floor. A curved guide surface 321b is formed in the skirt portion of the rotary bushing, the guide portion 321 being a concave segment of a sphere having a larger radius of curvature than the spherical bearing while being concentric therewith. The guide surface portion 321 faces the spherical bearing and acts to maintain the position of the bearing 330.

A contact member 340 is provided on an upper side of the rotor bushing 321. The contact member 340 protrudes a predetermined distance toward the bearing 330 and acts to limit contact between the rotor bushing 321 and the bearing 330. Namely, the contact member 340 is rounded on a side making contact with the bearing 330 such that contact between the contact member 340 and the bearing 330 occurs at a single point. Further, the contact member 340 is made of wear-resistant ceramic material.

On an outer cylindrical circumference of the rotor bushing 321, which is inserted in the mounting space 311a, are formed grooves 321c which oppose a cylindrical inner surface of the mounting space for allowing smooth rotation of the rotor 320 through the suction of a predetermined amount of air. The grooves 321c are herringbone-shaped for optimal suction of air, a predetermined amount of which enters through the grooves 321c to act as a lubricant between the rotor bushing 321 and the stator frame 311.

When the motor 300 of the rotating multi-faceted mirror system 200 structured as in the above is driven, the rotor 320 rotates the multi-faceted lens 210. The rotor bushing 321 also rotates together with the rotor 320, but as the contact member 340 makes only point-contact with the spherical bearing 330 only a limited amount of friction is created.

Further, even if friction is generated between the bearing 330 and the rotor bushing 321, the friction causes bearing 330 to rotate together with the rotor bushing 321, whereby the amount of wear is limited such that precise rotation of the multi-faceted lens 210 can be realized.

And finally, because the bearing 330 in the motor 300 of the present invention is spherical, it is easy to manufacture.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An electrical motor, comprising:

a stator frame forming a mounting space therein and carrying a stator coil;

a rotor bushing forming an insertion space communicating with said mounting space for forming a cavity together therewith, said rotor bushing carrying a rotor magnet disposed adjacent said stator coil to be driven thereby for rotating said rotor bushing about a vertical axis passing through said cavity; and a spherical bearing mounted in said cavity with said rotor bushing supported thereon, said axis passing through said spherical bearing;

said rotor bushing including a contact member making contact with an upper portion of said spherical bearing for transferring a weight of said rotor bushing to said spherical bushing;

said rotor bushing including an upper portion in which said contact member is disposed, and a cylindrical skirt portion extending downwardly from said upper portion, said skirt portion forming said insertion space, a lower portion of said skirt portion having a guide surface in the form of a concave spherical curve segment facing said spherical bearing and being concentric therewith and having a larger radius of curvature than said spherical bearing.

2. The motor according to claim 1 wherein the contact member includes a curved contact surface which makes substantially point contact with said spherical bearing.

3. The motor according to claim 1 wherein said skirt portion includes an outer cylindrical surface facing a cylindrical inner surface of said mounting space, said outer surface including grooves formed therein.

4. The motor according to claim 3 wherein said grooves are of herringbone-shape.

5. The motor according to claim 1 wherein the contact member is formed of a ceramic material.

6. An electrical motor, comprising:

a stator frame forming a mounting space therein and carrying a stator coil;

a rotor bushing forming an insertion space communicating with said mounting space for forming a cavity together therewith, said rotor bushing carrying a rotor magnet disposed adjacent said stator coil to be driven thereby for rotating said rotor bushing about a vertical axis passing through said cavity; and a spherical bearing mounted in said cavity with said rotor bushing supported thereon, said axis passing through said spherical bearing;

said rotor bushing including a cylindrical outer surface facing a cylindrical inner surface of the said mounting space, said outer surface having grooves formed therein.

7. The motor according to claim 6 wherein the grooves are of herringbone shape.

8. An electrical motor, comprising:

a stator frame forming a mounting space therein and carrying a stator coil;

a rotor bushing forming an insertion space communicating with said mounting space for forming a cavity together therewith, said rotor bushing carrying a rotor magnet disposed adjacent said stator coil to be driven thereby for rotating said rotor bushing about a vertical axis passing through said cavity; and a spherical bearing mounted in said cavity with said rotor bushing supported thereon, said axis passing through said spherical bearing;

said rotor bushing including a cylindrical skirt portion forming said insertion space, a lower portion edge of said skirt portion of said skirt portion having a guide surface in form of a spherical curve segment facing said spherical bearing and being concentric therewith and having a larger radius of curvature than said spherical bearing.

* * * * *